July 25, 1933.  J. S. KAMBORIAN  1,919,660
SHOE LASTING APPARATUS
Filed July 28, 1932   2 Sheets-Sheet 1
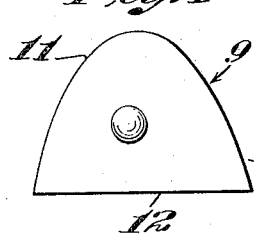
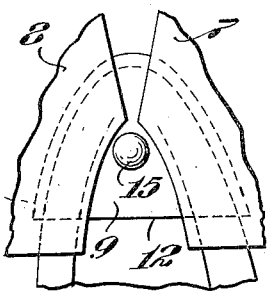
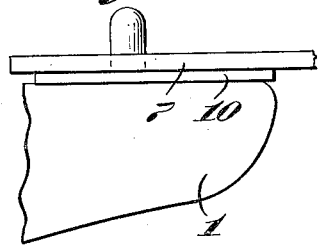
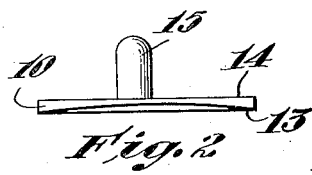
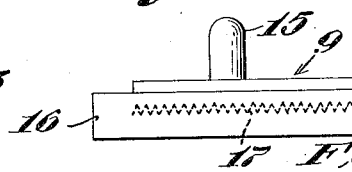
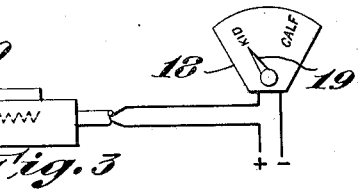
Inventor
Jacob S. Kamborian
by Roberts Cushman & Woodberry
Att'ys.

July 25, 1933. J. S. KAMBORIAN 1,919,660
SHOE LASTING APPARATUS
Filed July 28, 1932 2 Sheets-Sheet 2
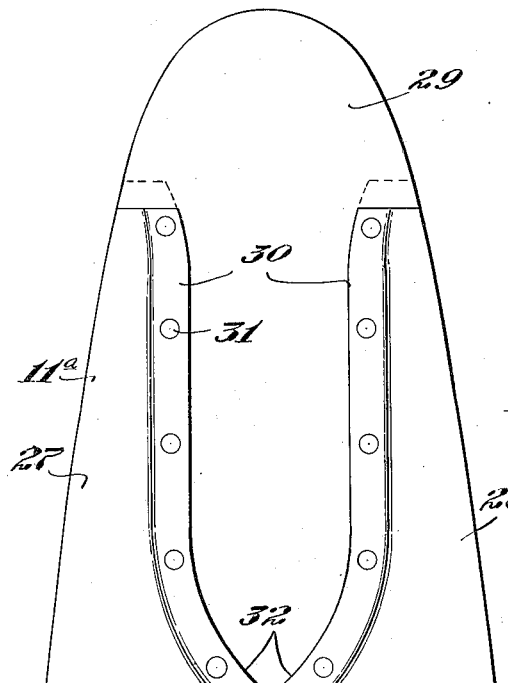
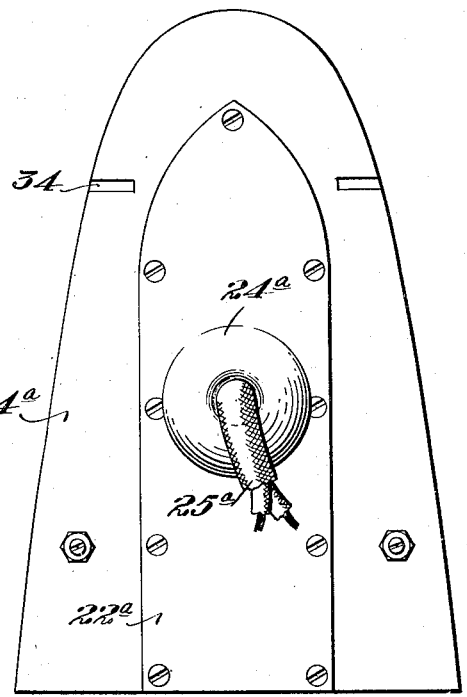
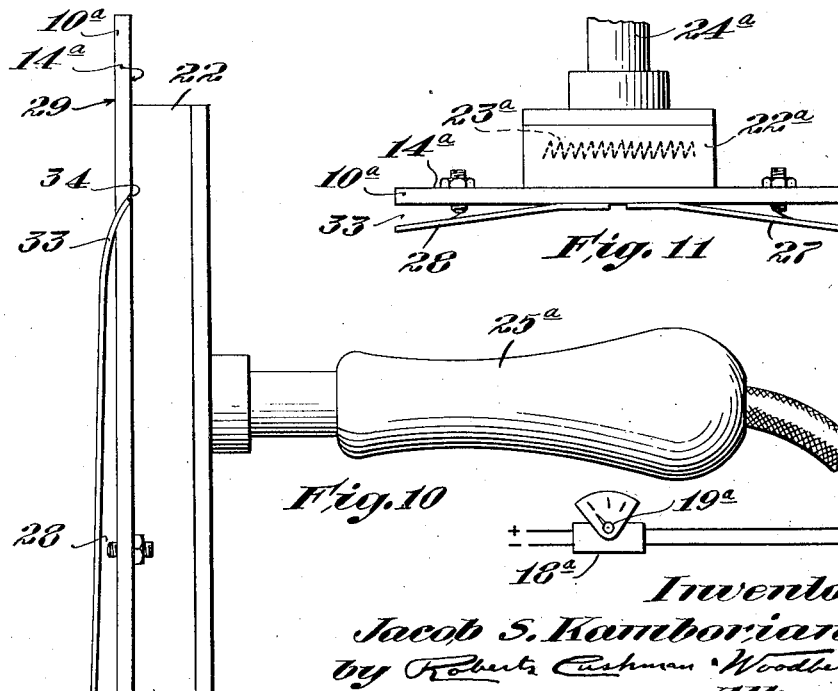
Inventor
Jacob S. Kamborian
by Roberts Cushman Woodberry
Attys.

Patented July 25, 1933

1,919,660

UNITED STATES PATENT OFFICE

JACOB S. KAMBORIAN, OF WEST NEWTON, MASSACHUSETTS, ASSIGNOR TO NORTHERN MACHINE CO., INC., OF BOSTON, MASSACHUSETTS, A CORPORATION OF MASSACHUSETTS

SHOE LASTING APPARATUS

Application filed July 28, 1932. Serial No. 625,285.

This invention pertains to shoe manufacture and relates more particularly to apparatus for use in lasting shoes, the present application being a continuation in part of my copending application Serial No. 515,921, filed February 16, 1931. In my aforesaid application I described one desirable process of and apparatus for use in lasting the end portions of shoes in which a heated presser device, preferably contoured similarly to the end portion of the shoe to be lasted, is disposed upon the marginal folded-in portions of the shoe upper which lie upon the bottom surface of the insole, the presser device being held under heavy compression against the marginal folded-in upper material until attaching cement interposed between the overlapping parts of the upper and insole has set. Thus the end portions of the shoe may be lasted by such process without recourse to pegs, stitches, tacks, staples, or other independent fastener elements, and I herein describe and, among other things, claim broadly means appropriate to the practice of the method which is claimed in my aforesaid application.

I have further discovered that by certain modifications of my prior process and apparatus, the marginal material of the upper may be flattened and leveled at the end of the shoe as described in my aforesaid application and that the material may also be smoothed and leveled for a substantial distance from the end, for example, along practically the entire forepart of the shoe, thereby providing an ideal surface for the reception of the outer sole, whether the latter be secured by cement or other means, for example, stitches.

In attaining these last-mentioned results, I provide a presser device which, while still preferably of the more or less semi-elliptical contour of that disclosed in my aforesaid application, is of greater length so as to cover more of the shoe bottom, and which preferably is furnished rearwardly of its curved forward end with resilient wings adapted to exert pressure upon the marginal upper material rearwardly of the toe portion of the shoe bottom, and to adapt themselves to the curvature or slope of the last at these parts.

In accordance with certain aspects of my invention, I prefer to employ a presser device which is portable and which has a built-in heater unit (preferably electrical), and in any event I find it desirable to provide means for accurately regulating the heat of the presser device in accordance with the type of work or the kind of leather.

In the accompanying drawings, wherein I have illustrated certain desirable embodiments of the invention by way of example, Fig. 1 is a plan view of a simple form of presser device useful in performing my method of lasting;

Fig. 2 is a rear edge elevation of the presser device of Fig. 1;

Fig. 3 is a side elevation of the same presser device shown resting upon an electric stove having means for controlling the heat imparted to the presser device;

Fig. 4 is a fragmentary bottom view of the forward end of a shoe showing the presser device in position for use, with the wipers of a bed lasting machine disposed on the margin of the presser device for forcing the latter against the shoe bottom;

Fig. 5 is a fragmentary side elevation showing the parts as positioned in Fig. 4;

Fig. 6 is a bottom plan view of a shoe illustrating the appearance of the shoe parts at the completion of side lasting, and before the toe lasting has been finished;

Fig. 7 is a fragmentary bottom view of the shoe at the completion of the toe lasting process in accordance with the present method;

Fig. 8 is a fragmentary side elevation of a presser device such as that of Fig. 1, but provided with a heater portable therewith;

Fig. 9 is a view similar to Fig. 4 but illustrating the use of a presser device such as shown in Fig. 8;

Fig. 10 is a side view, to larger scale, of a presser device according to a further modification and adapted to level the bottom material of the shoe over a substantial portion of the forepart, the device being shown standing on its rear edge;

Fig. 11 is a rear end elevation of the presser device of Fig. 10 with the handle broken away;

Fig. 12 is a bottom view of the presser device of Fig. 10;

Fig. 13 is a top plan view of the device of Fig. 10; and

Fig. 14 is a fragmentary view of the forepart of a shoe bottom illustrating the use of the presser device of Fig. 10.

In order to indicate the utility of the present invention, reference is first made to Fig. 6 of the drawings wherein the numeral 1 designates the upper of a shoe assembled upon a last together with the insole 2, and having the forward end of the upper pulled over the last and held temporarily in position by the pulling-over tacks 3. The marginal portions 4 of the upper are shown as having been lasted in over the insole along the sides of the shoe. As here illustrated these marginal portions 4 may be considered as held in lasted position by means of adhesive of suitable type, although so far as the present invention is concerned in its broader aspects, the type of fastener employed in the side lasting operation is immaterial.

For lasting in the margin of the upper material at the toe, it is customary to mount the last with the shoe parts thereon in a bed lasting machine and, after withdrawing the pulling-over tacks 3, to wipe in the marginal portion of the upper at the toe by means of the relatively movable wiper plates of the bed lasting machine. These wiper plates first engage the upper at a point below the level of the insole and then, while pressing the upper against the surface of the last, are raised and then slid inwardly over the bottom of the insole while approaching each other so as to wipe in the marginal material and draw it snugly about the toe portion of the last. Necessarily the approach of the wiper plates toward each other tends to gather in the fullness of the toe material at the mid-portion of the shoe bottom, producing pleats in the marginal portion of the upper material which must afterward be reduced to provide a level surface, either by trimming before the outer sole is applied or by a pounding operation after the outer sole is in place. Neither of these modes of leveling a shoe bottom is wholly satisfactory, and in many cases the irregularly folded and thickened mass of material at the toe is evident in a bulge or hump in the outer surface of the outer sole after the shoe is finished.

As more fully pointed out in my copending application Serial No. 515,921, I have discovered that by the proper application of pressure to the wiped-in material at the toe portion, before the outer sole is applied, a level bottom surface may be obtained while at the same time this application of flattening pressure may be employed to hold the wiped-in marginal portion of the upper in proper position until upper securing cement has set, thereby permitting the forepart of the shoe to be lasted without the use of permanent metallic fastener elements.

In producing the desired flattening pressure while holding the upper material in lasted-in position during the setting of cement, I have successfully employed a presser device such, for example, as shown in Figs. 1 to 5 inclusive. This presser device 9, in the embodiment illustrated in these figures, comprises a substantially rigid metallic plate 10, such as might be made, for example, by cutting off a portion of the toe end of the usual sheet metal bottom employed on lasts of certain types. A plate thus formed would have a curved forward end portion 11 and a substantially straight rear edge 12, although the shape of this rear edge is substantially immaterial. The device thus produced may be regarded as of substantially semi-elliptical shape, in which the ellipse is divided along its minor axis. The plate 10 is of such dimensions as to cover substantially all of the wiped-in marginal material at the toe portion of the shoe bottom and is preferably somewhat wider than that portion of the shoe bottom to which it is to be applied so that its edge portions will project outwardly beyond the outer margin of the insole. However, I contemplate that the device may have a certain degree of utility even though the plate does not extend beyond the margin of the insole, and I do not wish it to be understood that as a matter of commercial practice, such presser devices would ordinarily be made from metal last bottoms.

I find that for certain purposes it is desirable to make the under surface of this plate 10 upwardly concave, as shown in Fig. 2, so that when applied to the bottom of the shoe, the pressure will be at a maximum along the marginal portion 13 of the plate. The presser device is provided with an upper surface 14, preferably flat and adapted to underlie the wiper members 7 and 8 (Fig. 4) of the lasting machine, it being understood that after the toe portion of the upper has been wiped in by the lasting wipers the latter will be raised sufficiently above the level of the shoe bottom to permit the insertion of the marginal portions, at least of the pressure device 9, between the under surface of the wipers and the wiped-in marginal material of the shoe upper. After the first in-wiping movement of the wipers, portions of the lining or other upper materials may be trimmed away as usual, if desired.

Preferably, although not necessarily, the presser device is furnished with a handle member 15 by which it may be lifted and positioned between the wipers and the shoe bottom. While this handle is shown as adapted for manual manipulation of the presser device, I here employ the word "handle" as broadly inclusive of any means for moving the presser device into and out of operative position, whether such movement be accomplished directly by the hand of the operator or by mechanical means adjunctive to the bed lasting machine.

Preferably the plate 10 is heated before it is applied to the upper material, since I find that a heated plate is more effective in ironing smooth and in setting the wiped-in material in flat condition than is an unheated plate. Moreover, in the use of certain types of cement, heat is highly advantageous. For example, if rubber latex be employed as a cement, the use of heat causes the cement to set very rapidly, while, on the other hand, if the surface of the insole or the margins of the upper materials have been previously coated or impregnated with a cement which becomes active when heated, the use of the heated presser plate causes such cement to become active at the instant when its adhesive qualities are most necessary.

For heating the plate to the desired temperature, I may, for example, provide a stove 16, upon whose upper surface the plate may be positioned during the intervals between its use. This stove may, for example, have an electrical heating element 17 supplied with electrical energy from a suitable source, the heating effect of the heating element being controlled by a rheostat 18 having a switch and indicating device 19 cooperating with gradations which may be marked, for example, to correspond to the type of leather which is to be lasted. Thus, for instance, when the shoes have uppers of calf leather, the indicator 19 may be set to the gradation corresponding to calf leather, whereupon the operator will know that the proper amount of heat will be delivered to the presser device for use in dealing with leather of this character, while if leather of other type is to be employed, the indicator will be correspondingly positioned.

After the presser device has been interposed between the wiper plates and the shoe bottom, as described, the wiper plates are moved vertically downward against the surface 14 of the presser device, thereby forcing the entire presser device down against the wiped-in upper material, the parts being left in this position until the cement has substantially set. The application of heat and pressure very effectively flattens the wiped-in upper material as indicated at 20 in Fig. 7, thus producing a smooth and level bottom surface well adapted to receive the outer sole without bulging the latter, and being particularly desirable in the event that the outer sole is to be attached by cement or similar methods, since the flattened upper material is in the best condition for abrasion in accordance with the usual methods whereby to provide a good anchorage for the sole-attaching cement.

The presser device need be left in pressure-applying position but a relatively short time. For example, 10 to 15 seconds is ordinarily sufficient when dealing with leather of reasonably tractable nature. It may be remarked that this presser device is not secured to the shoe bottom during this process by tacks, prongs, screws, bolts or any other devices which penetrate or enter the insole or the folded-over upper material, so that immediately upon release of the presser by raising of the wipers, the presser device may be removed freely from the shoe bottom. The operation is thus very materially shortened as compared with processes in which a retaining device is secured to the insole by tacks, prongs, bolts, or the like, and in which event the retaining device must be pried off or otherwise detached at the completion of the upper securing operation.

While the device shown in Figs. 1 to 5 inclusive is highly desirable for the purpose, I find it somewhat more convenient to incorporate the heating element in the presser device itself. Thus, as illustrated in Figs. 8 and 9, the presser device comprises a plate 21 which may be of substantially the same size and contour as the plate 10 above described, but which is provided at its upper side with a centrally disposed housing 22 enclosing a heater element 23, for example, an electrical resistance coil. Preferably a handle 24 is secured to this housing 22, the handle having a passage for the electric conductor 25 (Fig. 9) which may lead to any desired and convenient source of electrical energy, preferably with the interposition of a controlling rheostat, such as that shown in Fig. 3. The heater housing 22 is so arranged as not to interfere with the superposition of the wipers 7 and 8 upon the outer marginal portion of the presser device so that the presser device may be interposed between the wipers at the shoe bottom in the same way as the presser device above described. However, in this instance the independent stove may be dispensed with and the presser device is always heated to the desired temperature for use.

The devices as previously described are described primarily for use in flattening the wiped-in material at the toe portion only of the shoe bottom, but I find that by lengthening the presser device it may advantageously be employed for flattening the wiped-in marginal material not only at the toe, but also along the sides of the forepart of the shoe. In accordance with usual methods of side lasting, the margin of the upper at the forepart is left somewhat wrinkled and in pleats, and when the outer sole is to be secured by cement, the abrasion of this pleated material to provide a good anchorage for the cement is somewhat difficult in view of its irregularity.

By the use of the modified form of presser device shown in Figs. 10 to 14 inclusive, I am able not only to level and flatten the marginal material at the toe, but also to smooth and level the marginal material along the sides of the forepart. For this purpose the presser device, as shown in Figs. 10 to 14 inclusive, comprises a plate 10ª, preferably stiff and substantially rigid and having a smooth under surface, such plate having a curved forward edge 11ª and usually being substantially straight at its rear edge 12ª, the general shape of the plate being substantially semi-elliptical but more elongate than the plate shown in Fig. 1, and in fact long enough to extend from the toe end of the shoe bottom substantially to the shank portion. Preferably a heater housing 22ª is disposed upon the central part of this plate at its upper side, extending longitudinally thereof, and having the heater element 23 housed within it. A handle 24ª projects from the housing and encloses the electrical conductor 25ª, which preferably extends to a rheostat 18ª having an indicator 19ª similar to that shown in Fig. 3. The housing 22ª is of such dimensions as to leave the marginal portion of the upper surface 14ª of the plate exposed so that such marginal portion may be inserted between the wipers 7 and 8 of the bed lasting machine (Fig. 14) and the bottom surface of the shoe.

Preferably, although not necessarily, I provide the plate 10ª with a pair of stiffly resilient wings 27 and 28 extending longitudinally of the plate at its under side. Preferably these wings are of spring steel and extend from a point spaced rearwardly of the forward-curved end of the plate to its rear end, leaving the forward portion 29 of the plate free for direct engagement with the bottom surface of the shoe, such forward portion operating in exactly the same way as the plate 10 and the plate 21, above referred to. The wings 27 and 28 preferably are provided with flanged portions 30 at their inner edges, which are permanently secured to the plate 10ª by means of rivets 31 or other suitable means. The forward ends of the flanges 30 preferably are spaced apart, while their rear ends approach each other, as shown at 32. Preferably the forward parts of the wings are upwardly curved at 33 and their ends are disposed in slots 34 in the plate 10ª, thus permitting the device to be slipped between the shoe bottom and the lifted wipers without danger of catching in the material of the shoe. The outer portions of the plates 27 and 28 are normally spaced from the under surface of the plate 10, but when the device is applied to the shoe bottom and subjected to pressure by means of the wipers of the bed lasting machine, these wings 27 and 28 are forcibly pressed against the wiped-in marginal portions of the upper along the sides of the forepart and by reason of their resiliency are enabled to maintain such pressure even though the bottom surface of the last and the insole may be curved or sloped, or otherwise disposed out of the plane of the toe portion of the last bottom. Thus, this device is capable of flattening the material at the toe portion and also of smoothing the material at the sides of the shoe bottom at the forepart so as to produce the desired smooth surface for the reception of the outer sole.

If desired, stops, for example, the adjustable set screws 35, may be provided for limiting the flexing of the wings 27 and 28.

While it is preferred to employ a portable device of this type manipulated by the hand of the operator, since I believe that this represents the quickest and easiest way of operating such a device, I contemplate that it may be supported mechanically and that it may be moved into and out of position mechanically by suitable operative connections, and I regard my invention as broadly inclusive of any method of manipulating the presser device.

While I have herein disclosed certain desirable embodiments of the invention by way of example, it is to be understood that these are merely by way of illustration and are not to be regarded as restrictive of the invention and that any suitable modification of shape, material, dimension, and relative arrangement of parts may be made within the scope of the invention, as defined by the appended claims.

I claim:

1. Apparatus for use in lasting shoes in a bed lasting machine wherein the marginal portion of a shoe upper is folded in over an insole mounted on a last, said apparatus comprising a portable pressure applying device including a plate shaped to overlie and to contact with substantially all of the folded-in material across the entire width of the forepart of the shoe bottom, said plate being stiff and rigid, said device also including a heater element permanently disposed in heat transferring relation to the plate, and a handle for manipulating the device.

2. Apparatus for use in lasting shoes in a bed lasting machine comprising a portable presser device shaped to conform substantially to the contour of the forward portion of a shoe bottom and to overlap the folded-in margin of the upper, said device having an under surface shaped to cover and contact said folded-in margin from one side to the other of the shoe, the under surface of said device being slightly concave upwardly whereby to exert greater pressure along the margins of the shoe bottom than at intermediate parts, said device having portions of such thickness as to permit them to be inserted between the shoe bottom and the wipers of the bed lasting machine.

3. Apparatus for use in setting the marginal portion of the upper material which is folded in over the insole during lasting, said apparatus comprising a portable presser plate shaped to conform substantially to the contour of the forward portion of a shoe bottom and to cover said forward portion from side to side thereby to overlap the folded-in margin of the upper, a handle for manipulating said plate, a heater housing upon the upper side of the plate, and a heater element within the housing for heating said plate to a predetermined temperature.

4. Apparatus for use in lasting shoes in a bed lasting machine comprising a portable presser plate having a curved edge portion of a contour corresponding substantially to that of the forepart of a shoe bottom, and having a substantially straight rear edge, said plate being adapted to overlie the folded-in margin of the upper, and means permanently mounted upon the plate and adapted to heat the latter to a substantially predetermined temperature, the marginal portion of the plate being of such thickness as to permit its insertion between the folded-in marginal portion of the upper and the wipers of a bed lasting machine.

5. Apparatus for use in setting the marginal portion of the upper material which is folded in over the insole during lasting, said apparatus comprising a portable presser plate having an under surface which is shaped to overlie and to contact with substantially all of the folded-in material across the entire width of the shoe bottom, the edge portion of said presser device being so shaped as to permit the wipers of the bed lasting machine to rest thereon for applying pressure to said device in the direction of the shoe bottom, and a handle for manipulating said device.

6. Apparatus for use in combination with a bed lasting machine for holding the wiped-in marginal portion of upper material in lasted-in position while attaching cement is setting, said apparatus comprising a portable presser device having an under surface shaped to overlie and to contact with substantially all of the wiped-in material across the entire width of the forepart of the shoe bottom of a shoe mounted in the lasting machine, the device being devoid of prongs or openings for the reception of other attaching elements but having portions designed for engagement by the wipers of the lasting machine so that the latter may exert pressure thereupon toward the shoe bottom, and a handle for positioning said presser device.

7. Apparatus for use in combination with a bed lasting machine for holding the wiped-in marginal portion of upper material in flat condition while attaching cement is setting, said apparatus comprising a portable presser device having a substantially rigid plate-like member of substantially semi-elliptical contour adapted to overlie the forward portion of the shoe bottom and to cover the folded-in margin of the upper, the device having an upper surface engageable by the wipers of the bed lasting machine for pressing the device forcibly against the shoe bottom, means for use in interposing said device between the wipers and the shoe bottom, and heater means movable with the device.

8. Apparatus for use in combination with a bed lasting machine comprising a presser device having portions adapted to overlie and to exert flattening pressure upon the wiped-in margin of the upper at substantially all portions of the forepart of the shoe regardless of the contour of the last bottom, said device also having a surface engageable by the wipers of the bed lasting machine whereby to transmit pressure from the wipers to the folded-in marginal material of the upper.

9. Apparatus for use in combination with a bed lasting machine for holding the wiped-in marginal portion of upper material in lasted-in position while attaching cement is setting, said apparatus comprising a portable presser device having a substantially rigid plate-like member provided at its upper side with a heater and with means for moving the device into and out of operative relation to a shoe mounted in the lasting machine, said plate-like member being shaped to cover substantially the entire forepart of the shoe bottom and having resilient wing members operative to compress the wiped-in marginal material at the sides of the forepart, the plate-like member having a marginal portion arranged to underlie and to be pressed downwardly by the bed lasting wipers.

10. Apparatus for use in combination with a bed lasting machine for holding the wiped-in marginal portion of upper material in lasted-in position while attaching cement is setting, said apparatus comprising a portable presser device having a substantially rigid plate of substantially semi-elliptical shape and of a size such as to cover the toe portion at least of the shoe bottom and to project outwardly beyond the edge of the insole, the under surface of said plate being shaped to overlie and to contact with substantially all of the wiped-in material across the entire width of the shoe bottom, and a handle for use in disposing the plate in operative position, the outwardly projecting portion of the plate being of such thickness as to permit its insertion beneath the lifted wipers of the bed lasting machine and being adapted to receive downward pressure of the superposed wipers whereby to flatten the wiped-in margin of the upper and the central portion of the plate being devoid of fastener receiving openings.

11. Apparatus for use in combination with a bed lasting machine for holding the wiped-in marginal portion of upper material in flat condition while attaching cement is setting, said apparatus comprising a presser device, said device having a surface engageable by the wipers of the bed lasting machine whereby to transmit downward pressure from the wipers to the wiped-in marginal material of the upper, said device having a heater disposed so as to avoid interference with the wipers, and a handle for moving the device into and out of operative position.

12. Apparatus for use in combination with the wipers of a bed lasting machine for holding the wiped-in marginal portion of upper material in lasted-in position until it has set, said apparatus comprising a movable presser device including a plate having a shoe bottom engaging surface shaped to overlie and to contact with substantially all of the wiped-in marginal material at the toe and along the sides of the forepart of the shoe bottom, said plate being stiff and rigid and devoid of prongs or openings for the reception of fastener elements, means for heating the plate, means for use in moving the plate into and out of operative relation to the shoe and wipers, and adjusting means for accurately predetermining the degree of heat of the plate in accordance with the kind of material to be lasted.

13. Apparatus for use in combination with a bed lasting machine for flattening the wiped-in marginal portion of upper material, said apparatus comprising a portable presser device having a stiff substantially rigid member adapted to overlie the forepart of the shoe bottom, the forward end of said member being substantially flat for exerting flattening pressure upon the wiped-in upper material at the toe, and resilient elements rearwardly of the forward end of said device adapted to exert resilient flattening pressure upon the marginal lasted-in material rearwardly of the toe portion, means for moving said device into and out of operative relation to the shoe bottom, and means for heating the shoe-engaging portions of said device.

14. Apparatus for use in combination with a bed lasting machine for ironing the marginal wiped-in upper material, said apparatus comprising a portable presser device comprising a substantially rigid and flat plate of substantially semi-elliptical contour and of such dimensions as to cover the toe portion at least of the shoe bottom, a heater housing mounted upon the upper surface of the plate, a heater element within the housing, and a heat insulating handle projecting from the housing.

15. Apparatus for use in combination with a bed lasting machine for ironing the wiped-in marginal portion of upper material while attaching cement is setting, said apparatus comprising a portable presser device having a rigid plate of substantially semi-elliptical contour and having a flat and smooth under surface, a heater mounted on top of the plate, a handle for manipulating the device, and a pair of resilient pressure-applying wings secured to the under surface of the plate.

16. Apparatus for use in combination with a bed lasting machine comprising a presser device comprising a plate of substantially semi-elliptical contour having a flat under surface, a heater member on top of the plate, a handle for manipulating the device, a pair of resilient pressure-applying wings secured to the under surface of the plate, the outer edges of the wings substantially registering with the corresponding edge portions of the plate and the inner edges of said wings being closer together at their rear ends than at their forward ends.

17. Apparatus for use in combination with a bed lasting machine comprising a portable presser device including a plate of substantially semi-elliptical contour and having a substantially flat under surface, a pair of resilient wing members extending longitudinally of the under surface of the plate, said wing members having flange portions engaging the plate, and means permanently uniting the flange portions to the plate, the outer margins of said wings being normally spaced from the under surface of the plate.

18. Apparatus for use in combination with a bed lasting machine comprising a portable presser device including a substantially rigid plate of semi-elliptical contour, a pair of resilient wing members extending longitudinally of the under surface of the plate from a point spaced rearwardly of its curved forward end substantially to its rear end, each wing being fixedly united to the plate along its inner edge and having its outer edge portion normally spaced from the under surface of the plate.

19. Apparatus for use in combination with a bed lasting machine comprising a presser device including a substantially rigid plate having a curved forward edge and a pair of resilient wing members at the under side of the plate, the wing members increasing in width from the forward portion of the plate toward the rear end of the latter.

20. Apparatus for use in combination with a bed lasting machine wherein the marginal portion of a shoe upper is wiped in over the insole, said apparatus comprising a portable presser device having portions adapted to be interposed between the lifted wipers of the bed lasting machine and the bottom of a shoe mounted in the machine, the presser device including a substantially flat plate adapted to conform substantially to the outer contour of the toe portion of the shoe bottom and having an under surface operative to cover and to contact with substantially all of the wiped-in material at the toe, the device having a portion engageable by the wipers and being operative to transmit downward pressure from the wipers to the shoe bottom, and means for use in moving the device into and out of operative relation to the shoe and wipers, the device being devoid of attaching fasteners or openings for the reception of fasteners and being freely removable from the shoe when released from the pressure of the wipers.

21. Apparatus for use in combination with a bed lasting machine comprising a presser device having parts designed to be interposed between the wipers of the bed lasting machine and the bottom of a shoe mounted in the machine, said device having an under surface operative to cover the wiped-in marginal material of the shoe upper at the toe portion at least and being devoid of prongs or other retaining elements so that it may be freely removed from the shoe when the pressure of the wipers is released, means for heating the under surface of the device, and a heat-insulated handle for moving the device into and out of operative relation to the shoe and the lasting machine wipers.

22. Apparatus for use in combination with the wipers of a bed lasting machine, said apparatus comprising a presser element constructed and arranged to be interposed between the lifted wipers of the machine and the bottom of a shoe mounted in the machine and to transmit downward pressure from the wipers to the toe portion of the shoe bottom, said presser element having surfaces designed for engagement by the lasting wipers and being insertable beneath and freely removable from below the lifted wipers by movement of the element in a direction substantially parallel to the shoe bottom, said element being stiff and rigid and devoid of projecting prongs or openings for the reception of fasteners, a handle for use in manipulating said presser element, and means for heating said element.

JACOB S. KAMBORIAN.